(No Model.)
G. BEEKMAN.
CAR COUPLING LINK.
No. 503,116. Patented Aug. 15, 1893.
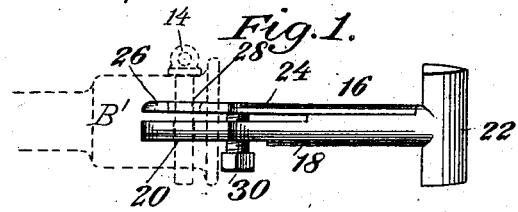
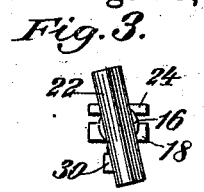
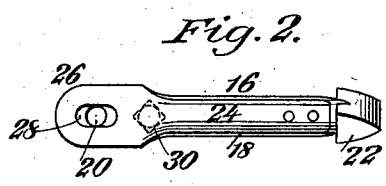
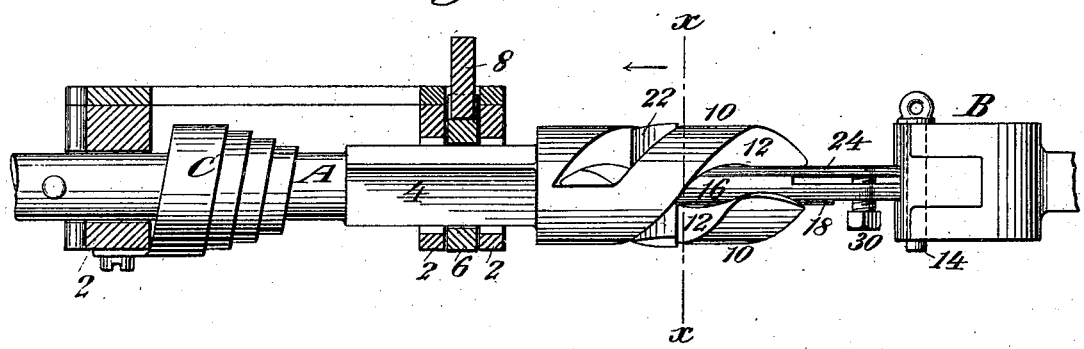
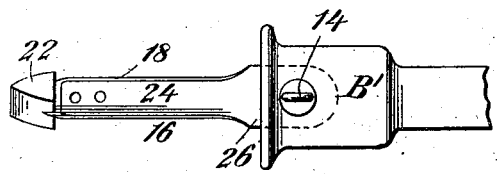
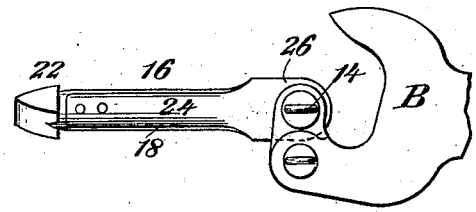
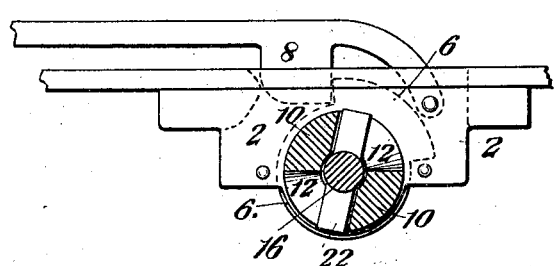
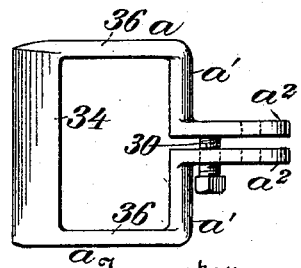
Witnesses:—
O. A. Hayford.
Henry Klein.
Inventor
Gerard Beekman
By his Attorney
Henry F. Parker.

UNITED STATES PATENT OFFICE.

GERARD BEEKMAN, OF NEW YORK, N. Y.

CAR-COUPLING LINK.

SPECIFICATION forming part of Letters Patent No. 503,116, dated August 15, 1893.

Application filed April 15, 1893. Serial No. 470,435. (No model.)

*To all whom it may concern:*

Be it known that I, GERARD BEEKMAN, of New York, county and State of New York, have invented a new and useful Improvement in Car-Coupling Links, of which the following is a specification.

This invention relates to means for connecting car couplers of different types, and it consists in a link adapted to engage at one end with any coupling head and at the other end with a coupling head of a character such as is shown in my application, Serial No. 440,311, filed July 18, 1892, which shows a coupling device having spiral projections for interlocking with a companion coupling head.

I will describe a coupling link embodying my invention, and then point out the novel features in the appended claims.

In the accompanying drawings: Figure 1, is a side view of my improved link; Fig. 2, a plan view; Fig. 3, an end view. Fig. 4, is a side elevation, partly in section showing the improved link, connected at one end to a coupling head of the Janney type and at the other end to a coupler head of the type shown in my application above referred to. Fig. 5, is a plan view showing the link in connection with a coupler head of the type shown in Fig. 4. Fig. 6, is a plan view showing the link connected at one end to the pin of an ordinary coupling head. Fig. 7, is a section on the line $x$, $x$, of Fig. 4, looking in the direction of the arrow; and Fig. 8, is a side elevation of a coupling link of modified construction.

Referring by reference characters to the drawings, A, designates a drawhead supported in suitable bearings 2, 2, wherein it is both longitudinally and rotatively movable. The part 4, of the draw head is made angular in cross-section and is extended through a corresponding opening in a collar 6, which operates rotatively between the forward bearings 2, and is designed to engage when in a locked position, with a suitable latching device 8, consisting of a pivoted lever having one end extended within reach of an operator.

The draw head A, has projections 10, which bear spiral faces 12. These projections are designed ordinarily to engage with another coupler head of a similar construction.

B, designates a coupling head of the Janney or similar construction employing a pin 14 for connection with an ordinary coupling link, and B', shows an ordinary coupling head with a pin 14.

16, designates the coupler link consisting of a shank portion 18, having a perforation 20, at one end through which the pin 14, may extend, and having a head portion 22, at the other end adapted to engage with the projections 10.

The head 22, is substantially wedge shaped in cross-section and its vertical plane is inclined laterally with relation to the horizontal plane of the shank portion 18, as plainly shown in Fig. 3.

I provide means to prevent vertical and lateral play of the link in the coupler head B or B'. As here shown this means consists of a plate 24, of yielding or resilient metal attached to the shank 18, by means of a rivet or bolt. The free end 26, of the plate 24, is longitudinally slotted as at 28, for the passage of the pin 14.

30, is an adjusting device whereby the free end of the plate 24, may be adjusted relatively to the shank 18, to compensate for wear or to accommodate the device to coupler heads of slightly varying sizes. This adjusting device consists of a screw threaded post engaging in a tapped hole in the shank 18, and impinging on the plate 24.

In the modification shown in Fig. 8, the head portion 34, has link arms 36, extending outward from its ends. The horizontal portions $a$, of these arms are made flat so as to provide a slight spring. The vertical portions $a'$, may be round and the parts $a^2$, are provided with holes for the passage of a coupling pin. An adjusting screw 30, is engaged between the portions $a^2$. This form of link is intended to be used between two cars having their coupling heads on materially different levels.

I have shown and described my invention as connected at one end to a link pin, but I do not wish to be limited thereto as it is obvious that it may be adapted to engage with other forms of couplings without departing from the spirit of my invention.

In operation, one end of the link is first engaged with a coupler head by means of a coupling pin and the head portion 22, is so pointed as to enter between the spiral faces 12 of an opposite coupler readily, this fixture of place being maintained by means of the screw 30. In this position the link will couple automatically by impact with the opposing coupler with spiral projections in the following manner: When cars are brought together the head 22 will engage the faces 12 of the spiral projections 10 of the opposing coupler, and will rotate the coupling head against the resistance of the spring C, until the latch 8, locks the coupling from further rotation in either direction. Upon releasing the latch 8 the draw head, assisted by the spring C, will rotate in a reverse direction until the head portion 22 of the link is discharged from the faces 12 of the projections 10.

Having described my invention, what I claim is—

1. A coupling link provided with a head at one end adapted to engage with a rotary coupling head having spiral projections, and provided with means for securing its opposite end to another coupling head in a non-rotary position.

2. A coupling link provided at one end with a transverse projection adapted to engage with a rotary coupling head having spiral projections, and provided with means for securing its opposite end to another coupling head in a non-rotary position.

3. A coupling link provided at one end with a perforation adapted for the reception of a coupling pin to support it in a non-rotary position, and at its opposite end provided with a head adapted to engage with a rotary coupling head having spiral projections.

4. A coupling link having in combination, a shank portion or portions to engage a coupling head, and a head portion on the shank or shanks, substantially wedge shaped in cross-section and arranged at a lateral incline relatively to the shank or shanks.

5. A coupling link having in combination, a shank portion adapted to engage a coupling pin, a head portion on the shank adapted to engage a coupling head, and the yielding plate.

6. In a coupling link, the combination of the shank portion constructed to engage a coupling pin, a head portion on the shank constructed to automatically engage a coupling head, a yielding plate secured to the shank portion and means for adjusting the same.

GERARD BEEKMAN.

Witnesses:
EUGENE LUCAS,
CLARENCE R. FERGUSON.